United States Patent [19]
Jacobs et al.

[11] Patent Number: 6,126,548
[45] Date of Patent: Oct. 3, 2000

[54] MULTI-PLAYER ENTERTAINMENT SYSTEM

[75] Inventors: Robert S. Jacobs, Westlake Village; Gerald B. Isdale; William M. Porada, both of Thousand Oaks, all of Calif.

[73] Assignee: Illusion, Inc., Van Nuys, Calif.

[21] Appl. No.: 08/947,217

[22] Filed: Oct. 8, 1997

[51] Int. Cl.$^7$ .................................................. F41G 9/00
[52] U.S. Cl. ................................................ 463/42; 463/6
[58] Field of Search ................................ 463/6, 40, 41, 463/42; 434/29, 60, 61, 62, 63, 64, 65, 28

[56] References Cited

U.S. PATENT DOCUMENTS

| | | |
|---|---|---|
| 4,196,528 | 4/1980 | Foerst . |
| 4,517,656 | 5/1985 | Solimeno et al. . |
| 4,564,923 | 1/1986 | Nakano . |
| 4,572,509 | 2/1986 | Sitrick ...................................... 463/42 |
| 4,787,024 | 11/1988 | Allsop et al. . |
| 4,958,835 | 9/1990 | Tashiro et al. . |
| 4,998,199 | 3/1991 | Tashiro et al. ............................. 463/42 |
| 5,044,956 | 9/1991 | Behensky et al. . |
| 5,275,565 | 1/1994 | Moncrief . |
| 5,299,810 | 4/1994 | Pierce et al. . |
| 5,366,376 | 11/1994 | Copperman et al. . |
| 5,368,484 | 11/1994 | Copperman et al. . |
| 5,399,091 | 3/1995 | Mitsumoto ............................... 434/61 |
| 5,435,725 | 7/1995 | Ikeuchi . |
| 5,516,295 | 5/1996 | Stove . |
| 5,547,382 | 8/1996 | Yamasaki et al. ........................ 434/61 |
| 5,583,844 | 12/1996 | Wolf et al. . |
| 5,674,127 | 10/1997 | Horstmann et al. ...................... 463/42 |
| 5,879,236 | 3/1999 | Lambright ................................ 463/42 |
| 5,910,046 | 6/1999 | Wada et al. ................................ 463/6 |
| 5,919,045 | 2/1986 | Tagge et al. .............................. 434/62 |
| 5,921,780 | 7/1999 | Myers ........................................ 463/6 |
| 5,984,786 | 11/1999 | Ehrman .................................... 463/42 |

*Primary Examiner*—Michael O'Neill
*Assistant Examiner*—John Paradiso
*Attorney, Agent, or Firm*—Blakely, Sokoloff, Taylor & Zafman LLP

[57] ABSTRACT

A modular, interactive, reconfigurable simulation system is designed to provide a variety of simulation experiences. The system has a distributed state machine architecture to facilitate reconfiguration and technological update. A typical simulation system constructed in accordance with the present invention includes a plurality of simulator stations. Each station includes a seat for the player/operator and controls and displays that are appropriate for the simulation experience. Each simulator station is preferably mounted on a motion base to provide the player/operator with sensory inputs consistent with motions of the simulated vehicle. Each simulator station is controlled by an associated host computer. The host computer maintains a state vector which describes the current state of the associated simulated vehicle within the simulated world. The host computer calculates interaction between moving objects and the underlying terrain data base by mapping 3D terrain objects into 2D maps. The host computers for each simulator station are interconnected by a communication network over which the state vector for each simulator station is available to all other simulator stations. Each host computer is therefore able to track all other simulated vehicles. In addition to the inter-station network, each simulator station has a local network with which the host computer communicates with modular resources for providing images, sounds, motions and other sensory inputs to the player/operator. Except for software, these modular resources are essentially independent of the particular simulated experience. The subsystem that produces and displays images employs a technique for blending multiple channels into a single wide field of view image, and a technique for implementing very rich texturing in the scenes presented. In order to reconfigure the system of the present invention for a new simulated experience, it is necessary only to change the software executed by the host computers and the physical simulator module.

19 Claims, 3 Drawing Sheets

MULTI-PLAYER ENTERTAINMENT SYSTEM

BACKGROUND OF THE INVENTION

1. Field of the Invention

This invention relates generally to the field of interactive simulators. More particularly, the invention relates to a modular, interactive, reconfigurable simulation system based on a distributed state machine architecture.

2. Prior Art

Video arcade games which simulate the operation of vehicles, such as race cars or aircraft, have become extremely popular. The popularity of the games has led to the development of increasingly sophisticated simulation systems, both for single players and for multiple players. One type of multiple-player system simulates an automobile race. Players sit in individual simulated cockpits and are presented with a display depicting a virtual environment which contains the simulated vehicles of all other players. Each player's simulated vehicle responds to his or her control inputs in a realistic manner. Furthermore, the simulated vehicles interact with one another according to physical principles if two or more vehicles attempt to occupy overlapping volumes of simulated space.

Another example of a prior art multi-player simulator system is disclosed in U.S. Pat. No. 5,299,810. This system has a pair of stations for players to "drive" respective simulated vehicles through a simulated space and to fire a simulated gun at the other player's vehicle. Each user sits in front a video monitor and each monitor is electrically connected to a computer. Each computer has a "map" of a simulated space stored in electronic memory and the two computers are linked through a common RAM. The computers continually access the common RAM to determine whether a shot has been fired by the other player and, if so, to compute whether or not the shot has "hit" the associated vehicle.

Reconfigurability

Heretofore, multi-player simulation systems have been purpose-built for the specific simulated experience desired. Thus, a system for simulating an automobile race is typically designed for that application alone and cannot be reconfigured to simulate a different experience. Prior art multi-player simulation systems are, in effect "hard-wired" for a particular experience. Although it is relatively easy to reconfigure a racing simulator to simulate different tracks, such a simulator cannot be reconfigured to simulate, for example, a dogfight scenario involving fighter aircraft.

It is, of course, well-known that the public's interest is often transient. Trends and fads come and go. Therefore, it would be desirable to provide a multi-player simulation system with a modular architecture that can be easily reconfigured to simulate any of a variety of experiences. Such a simulation system could therefore take advantage of changing public interests.

Modularity

It is also widely recognized that electronic computer technology continues to improve at a rapid pace. More's "Law"—a commonly used estimator of this advance —says that computer capabilities double and costs halve approximately every 18 months. Therefore, purpose built systems quickly become obsolete, as higher performance components that cannot be accommodated in the system become widely available. Buyers of purpose built systems, thus, find themselves required to either live with systems that are no longer competitive or make the large capital investment to replace the entire system with a more advanced simulator. The capability to inexpensively insert advanced technology components into existing simulators would extend the life of such systems and greatly enhance the return on initial and incremental capital investment.

Immersive Mosaic Visual Display

Psychologists have noted that the suspension of disbelief in the reality of a synthetic experience is facilitated by the broadening of the visual environment to include peripheral visual cues. In general, the wider the active visual surround, the more "immersive" a simulation becomes. Wide field of view displays of computer generated imagery demand spatial resolution on the order of 3–4 arc-minutes per pixel or better in order to be perceived as real. To achieve this pixel density for an image of substantial visual angle, the simulation must either generate a very high resolution image which is then displayed by a means that wraps this picture around the viewer, or create multiple complimentary images of small resolution and blend them together to create a seamless mosaic of smaller pictures. The latter approach generally offers the advantage of employing less expensive projection equipment, obviates the need for exotic projection optics, and usually provides more brightness on the screen.

To support seamless multiple channel projection, a technique must be used to "blend" adjacent mosaic elements. Two prior U.S. Pat. Nos. (4,974,073 and 5,136,390) describe a means to achieve such image blending by the use of brightness ramped overlap regions between adjacent images where the brightness adjustment is provided by special hardware interpolated between the image source and the projection systems. Where the imagery to be blended is generated by a computer, however, image content can be structured by the rendering device to support such image blending by a different technique that does not require this additional hardware.

SUMMARY OF THE INVENTION

The present invention provides a modular, interactive, reconfigurable simulation system so that a variety of simulation experiences can be provided and so that upgrades of technology components can be easily and inexpensively accommodated. The system utilizes a distributed state machine architecture to facilitate these reconfigurations and upgrades. It also provides hardware and software components that dramatically increase the performance of low-cost commercial, off-the-shelf products incorporated in the system's visual image generation and presentation subsystem. Finally, it provides an immersive wide-field-of-view visual environment using a method that requires no special purpose image blending hardware.

A typical simulation system constructed in accordance with the present invention includes a plurality of simulator stations. Each station includes a seat for the player/operator and controls and displays that are appropriate for the application simulation experience. For example, in the case of an auto racing simulation, the simulator station may include a steering wheel, gear shift and accelerator, brake and clutch pedals. A wide field-of-view display is provided to simulate the view from a race car cockpit. Each simulator station is preferably mounted on a motion base to provide the player/operator with sensory inputs consistent with motions of the simulated vehicle, although the modular, reconfigurable architecture allows either the incorporation or deletion of a motion system, depending on the performance level and price desired.

Each simulator station is controlled by an associated host computer. The host computer maintains a state vector which describes the current state of the associated simulated vehicle within the simulated world, i.e., its position, orientation, velocity, acceleration, and other attributes that might be perceived by either the operator of the vehicle or other participants in the virtual experience. The host computers for each simulator station are interconnected by a communication network over which the state of each simulated vehicle is made available to all other simulator stations. Each host computer is therefore able to track all other simulated vehicles.

In addition to the inter-station network, each simulator station has a local network with which the host computer communicates with modular resources for providing images, sounds, motions and other sensory inputs to the player/operator. Except for application software, these modular resources are essentially independent of the particular simulated experience.

In order to reconfigure the system of the present invention for a new simulated experience, it is necessary only to change the dynamic modeling software, the control and display input/output software executed by the host computers and the physical simulator module. e.g. to replace a simulated race car cockpit with a simulated fighter aircraft cockpit. All other physical components of the system, including the computers, projectors, sound system, and motion base for the simulator station are unaffected.

In order to upgrade a technology component of the system it is only necessary to remove and replace that component with another configured to communicate with the balance of the system through a common defined protocol, rather than having to redesign the system or rewrite the underlying system software to accept the new component.

DETAILED DESCRIPTION OF THE INVENTION

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods and devices are omitted so as to not obscure the description of the present invention with unnecessary detail.

Figure 1:
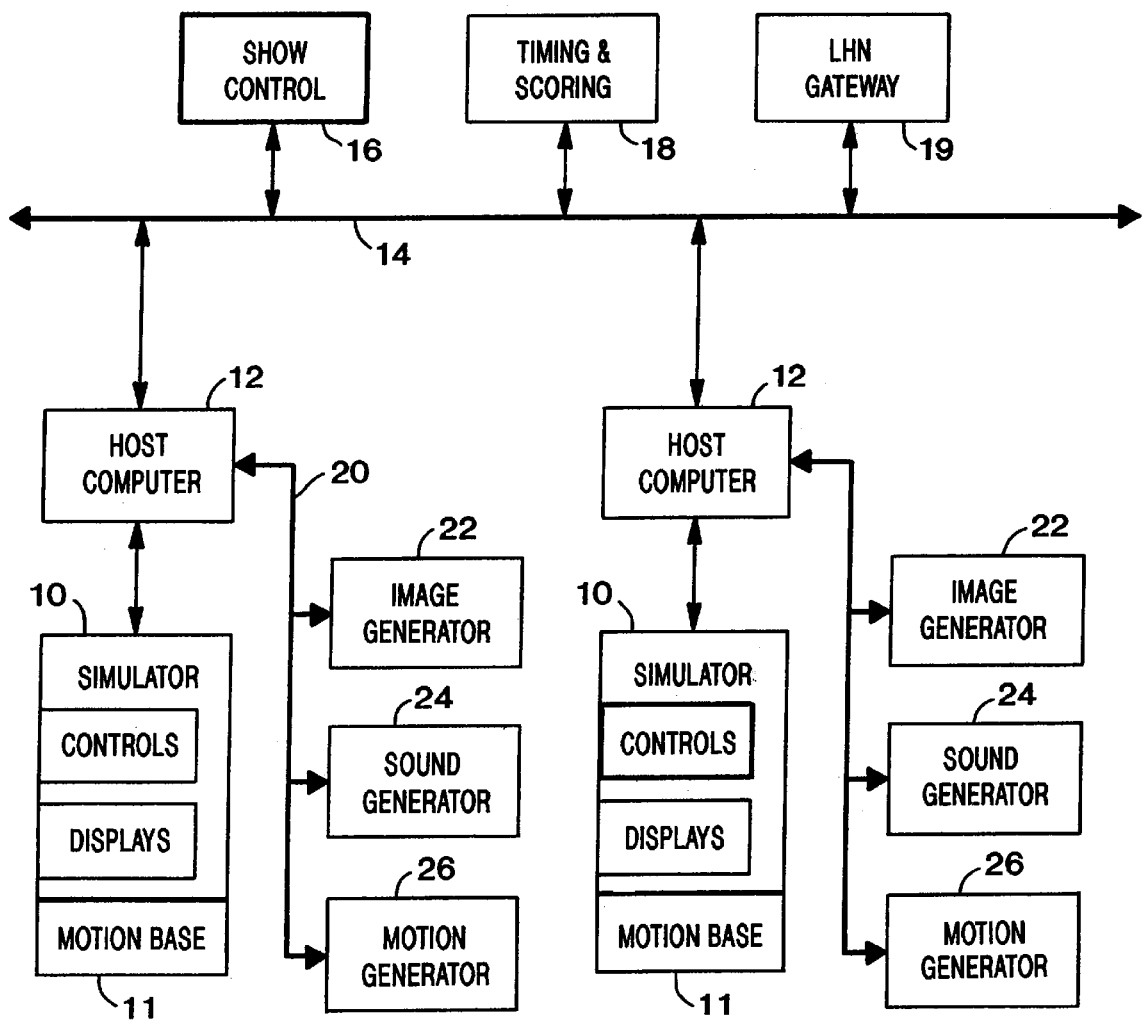
FIG. 1 is a block diagram of a multi-player entertainment system in accordance with the present invention.

FIG. 1 is a functional block diagram of an interactive simulation system constructed in accordance with the present invention. Although the invention is illustrated with an embodiment for providing multi-player entertainment, it is to be understood that the invention is applicable to a wide variety of simulation systems with both commercial and military applications. FIG. 1 illustrates: 1) how multiple independent simulators are networked together; and 2) how the major hardware components are modularized and decoupled, for ease of component modification and upgrade. The system includes a plurality of simulators 10. In most applications, each simulator will accommodate an individual player, although the simulators may be configured to accommodate more than one player each. In a particular embodiment of the present invention, the simulators are configured to resemble racing automobiles. Each such simulator includes a seat for the player/operator. Player-operated controls are provided as appropriate for the particular simulated experience. In the case of a simulated racing car, the controls will typically include a steering wheel, gear shift, and accelerator, brake and clutch pedals.

The present invention is not limited by the nature of the simulated experience. Indeed, one of the principal advantages of the present invention is its ability to accommodate a variety of simulated experiences with minimal reconfiguration. Simulators 10 may be configured to represent any of a variety of different vehicles, including aircraft, spacecraft, water craft and various types of land vehicles In each case, appropriate controls are provided to the player/operator.

Simulator 10 also includes a visual image generation and display subsystem that presents to the player a simulated view of the outside world. The display preferably covers most or all of the player's field of view, so as to make the simulated experience as realistic as possible. It is normally created from multiple channels of real-time computer-generated imagery seamlessly blended into a single wide field of view display. For example, in the case of a simulated racing car, a main visual display, extending into the player's peripheral field of view, is provided for the forward and side views seen from the driving position. Smaller single channel displays may be provided to represent the views seen in rear view mirrors. Additional displays may be provided to represent the dashboard or instrument panel displays that are typically presented to the driver of a racing car.

Simulator 10 also includes one or more audio speakers to provide a dynamic audio environment. Multiple speakers are preferably provided to create a multi-dimensional spatialized sound environment that presents sounds apparently issuing from a position in the real world corresponding to the computed relative location of the virtual sound sources.

Simulator 10 is mounted on a motion base 11 to provide the player with the physical sensations of vehicle accelerations and rotational/translational movement. Motion base 11 is preferably a six-axis system providing roll, pitch, yaw, heave, surge and sway movements. In a particular embodiment of the invention, motion base 11 is hydraulically actuated, however other means of actuated motion, including but not limited to electical, pneumatic, and electromagnetic, may be used.

Each simulator 10 has an associated host computer 12. The host computer controls all aspects of simulator 10. A block diagram of the software running in the host computer 12 is provided as FIG. 2, which shows that the simulation software modules combine to form a distributed state machine, in which all modules communicate with one another through the medium of a state table, each element of which is updated by one and only one module. The decoupled distributed state machine architecture of the host computer software allows for software component upgrade or replacement without a "ripple effect" on remaining components. The functions performed by host computer 12 include input/output routines for the cockpit controls and displays; calculation of own vehicle dynamics; local "show" control; performance assessment; and communications with other components of the system via networks 14 and 20 as described below. Host computer 12 controls and coordinates the simulated motion of the simulated vehicle within the virtual world based on control inputs from the player, the motion of other vehicles and simulated vehicle dynamics.

Sensory feedback is provided to the player by means of visual imagery, sounds and movements coordinated with the simulated operation of the represented vehicle in addition to cockpit instrument indications driven by its computed state. In a particular embodiment of the invention, host computer 12 comprises a dual Pentium Pro 200 MHz microprocessor system with real time extended Windows NT operating software. Other computer platforms and operating systems could also be used.

A typical entertainment system constructed in accordance with the present invention may include a dozen or more simulators 10, all of which interact with one another as in a simulated race. To facilitate such interaction, each of the host computers 12 is coupled to a local area network 14. In a particular embodiment, network 14 is a 10 base T Ethernet Network referred to as the "Gamenet".

Figure 2:
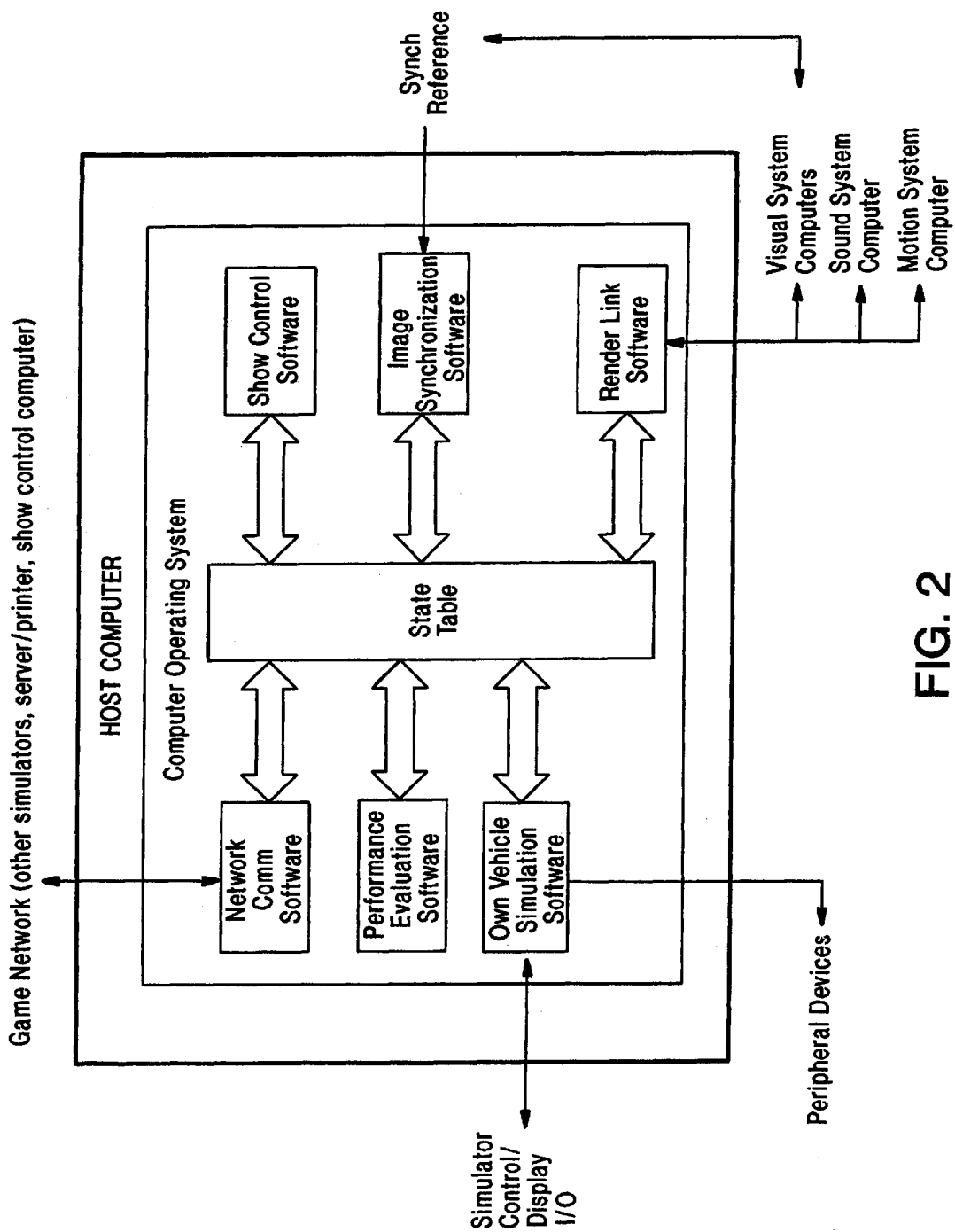
FIG. 2 is a more detailed view of the host computer.

The entertainment system comprising the simulators 10, which are coupled through host computers 12 to network 14, operates as a distributed state machine, as shown in FIG. 2. Each of the host computers 12 maintains a state vector defining the current state of its associated simulator. The state vector is a comprehensive description of all aspects of the simulator, including location and orientation coordinates, velocities and accelerations of the simulated vehicle within the simulated world. Elements of the state vector that are relevant to other simulators in the system are posted on network 14 by each host computer asynchronously as the state of the simulator diverges from that calculated by a low resolution dead reckoning model of its behavior by more than a preset threshold. Each simulator runs such a dead reckoning model for itself and all other simulators in the common virtual environment. Updates to the state parameters for each simulated platform are thus maintained either by the dead reckoning process (as long as its accuracy remains within the defined thresholds of error) or by broadcast state updates that correct the dead reckoning estimates. By this means, network traffic is minimized, while at the same time, the state vector for each simulator is available to all other simulators on the network.

Each of host computers 12 examines the state vectors for all other simulators in the system so that each simulated vehicle can be properly represented on the players' displays. Furthermore, each host computer 12 determines from the state vectors of the other simulators if there is an interaction, e.g., a crash, with another simulated vehicle. In the event of such an interaction, the resultant effect is computed by the own vehicle dynamics function in host computer 12.

Show control computer 16 is also coupled to network 14. This computer handles administrative tasks for the entertainment system as a whole. Also coupled to network 14 is a server and printer 18 which provides print-outs of performance feedback information calculated in the Timing and Scoring software modules of each simulator. Optionally, a gateway 19 to a long haul network may also be coupled to network 14 so that entertainment systems at separate locations can be interconnected.

In addition to the Gamenet network 14, each of host computers 12 is coupled to a local 10 base T Ethernet network 20. This network, referred to as the Renderlink™ network, couples the host computer 12 simultaneously to various clients that perform special purpose computer functions. In the exemplary embodiment of the invention, these clients include image generator 22, sound generator 24 and motion generator 26. Additional clients may be added as necessary to provide desired simulation effects. For example, multiple image generators 22 may be coupled to network 20, each of which would be responsible for processing a respective portion of the total field of view. Each of the clients receives state-of-the-world data at the same time on network 20 by way of a broadcast of relevant elements of the state vector maintained by host computer 12. Each client extracts information from the broadcast as necessary to perform its assigned functions.

The communications protocol for network 20 utilizes message packets that are broadcast in frames at a nominal rate of thirty frames per second. The packet format contains three major sections: an IPX header, a packet header and the body of the packet. All packets are transmitted with standard IPX header information in accordance with IPX standards. The packet header contains a type identifier, a packet ID, a frame ID, a continuation slag, a time stamp and a checksum. The type identifier indicates the contents of the particular packet. This information is used by the clients connected to network 20 to filter the arriving packets for relevancy. Each client will utilize only those packets which contain information relevant to the particular functions of the client. Other packets are ignored. The packet ID indicates the number of the packet in the sequence of packets that are sent during a given frame. Each frame begins with packet 0. The frame ID indicates the current frame number. This is an integer counter that begins when the system is initialized and is incremented for each frame. The continuation flag indicates when another related packet is to arrive in the same frame. The time stamp comprises a millisecond counter to facilitate synchronization of events by clients connected to network 20 and to verify correct receipt of packets. The body of the packet contains a variable number of message bytes depending upon the information content of the packet. Some packets, whose functions are fully communicated by the type identifier, will not include a body portion.

The present invention includes software components that greatly enhance the efficiency of the own vehicle simulation calculations, thus allowing the use of low cost, consumer PCs rather than expensive special purpose work stations to act as the simulation hosts. Specifically, the components that calculate collisions between a car and another object in the virtual world (either another car or a fixed object) use a unique technique for collision detection with fixed objects via the terrain database. The terrain database provides a mapping of points in 3-space to a unique terrain surface. Part of the terrain database functionality uses this unique surface to define the height (Z) value of the terrain for a given XY point (projection of 3D XYZ point onto a 2D terrain map). The surface type of the terrain indicates whether or not the surface is a collidable object (e.g., a wall). This allows the testing of points on the 'bounding shadow' of a moving object (the car) against the terrain database. (The bounding shadow is the projection of the bounding box on the XY plane, i.e. ignoring Z)

If any of the corners of the bounding shadow are found to be over/inside a "wall" surface type, then a collision with that wall is calculated to have occurred. The 'direction' and 'normal' of the edge of the wall with which the car has collided can be retrieved from the database for use in collision reaction computations. The benefit of this concept is that it avoids the computationally costly polygon/polygon intersection tests normally used in collision detection. It substitutes the simple algorithms for point-inside-polygon tests. The system also can detect some wall collisions by checking that opposite corners of the bounding shadow are on different non-wall surfaces. For example on a race track database, there may be an 'island' that separates the track from the pit area. This island has two pointed ends. It is possible to collide with a pointed end without having any of the corners of the bounding shadow inside the island, e.g., in a head on collision. In this case, the system detects that one side of the shadow is on the 'track' and another is in 'pit lane (entrance/exit)'. It then knows to test the end points of the island object for inclusion inside the bounding shadow. If an end point of the island is found to be inside the shadow, then a collision has occurred.

Enhanced Rendering

The present invention also includes hardware and software components that greatly enhance the performance of low-cost, (commercial, off-the-shelf graphics cards, combining with them to generate imagery of a quality and complexity comparable to that generated by special purpose image generator computers costing many times more. There are two such components: blended image generation and dynamic texture management Blended image generation requires the synchronization of multiple image generator computers to produce their respective pieces of the total vista, as well as the creation of edge blending tools to make the seams between the different pieces invisible to viewers.

Synchronization of the image generators is required because each image generator may occasionally fail to complete a frame update at a given cycle time (in a particular embodiment, once every thirtieth of a second) because it is overloaded. Over time an accumulation of these "drop-outs" will cause the several different computers producing pieces of the total view to be projecting segments that reflect differing assumptions as to the viewer's eyepoint location and/or line of sight orientation. Overcoming this problem is accomplished by a unique hardware/software arrangement. A cable is connected to each one of the image generation computers and to the simulation host computer. The cable terminates at the parallel port of each computer. One of the image generator computers is designated as a synchronization source and provided with software that coordinates the activities of itself, the host and the other image generators. At the beginning of each update cycle (nominally every thirtieth of a second) it directs the other image generators to wait, then signals the host to send the next state broadcast over the internal network. Once it receives the state broadcast, it sends another signal to the other image generators to start them rendering that frame. This ensures that all of the image generators are rendering the frame representing the same state data at the same time.

Figure 3:
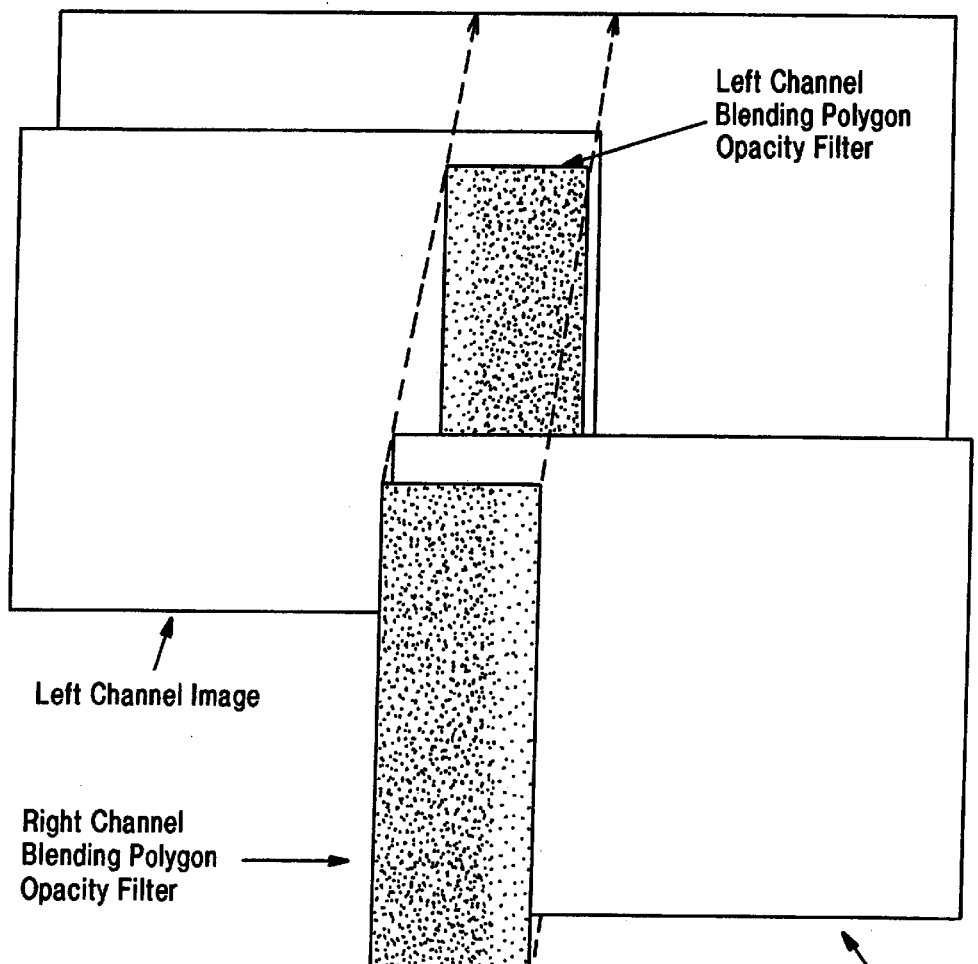
FIGS. 3 and 4 illustrate the process used in the present invention for blending multiple channels of computer generated images into a seamless vista.
Figure 4:
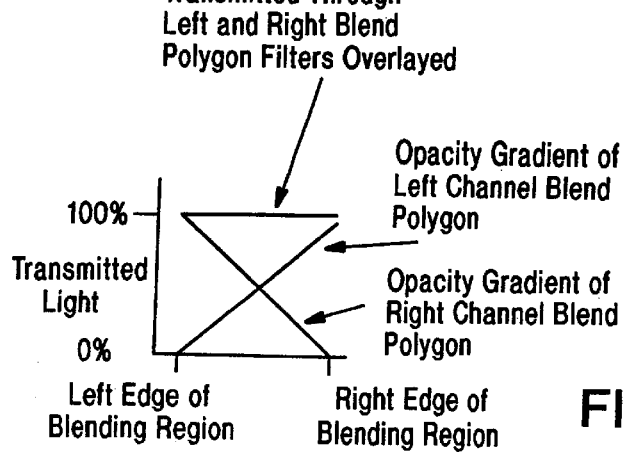

FIGS. 3 and 4 illustrate the process by which the edges of the multiple images are blended into a seamless vista through the introduction of computed graphical objects called edge blending polygons into the visual scene. The polygons are each assigned an opacity gradient from transparent to opaque across the breadth of the object. FIG. 3 illustrates a single edge blending rectangle at the edge of each image. Each rectangle may comprise a plurality of smaller polygons, such as triangles.

One or more edge blending polygons are placed in the visual scene of each channel and fixed with respect to the viewing eyepoint line of sight. Thus, as the other objects in the scene rotate in accordance with simulated eyepoint movement, the edge blending polygons remain in the same location on the display surface. A three channel arrangement is used on the race car embodiment; however, any number of channels can be blended together using this technique. The left channel image includes edge blending polygons on the right hand side; the right channel image includes edge blending polygons on the left side; and the center channel includes edge blending polygons on either side.

The edge blending polygons in adjacent abutting channels are overlaid with each other by projecting the channels with an overlap the width of a polygon. The polygon on the left side of the center channel is, thus, projected on the same screen area as the polygon on the right side of the left channel. As shown in FIG. 4, the polygon on the left side of the center channel goes from opaque to transparent, right to left, while the polygon on the right side of the left channel goes from opaque to transparent, left to right. By adjusting the opacity gradients of the two polygons, a given point on the screen receives a certain percentage of light from one channel and a complimentary percentage of light from the image with which it is blended. The boundary between the two images is thereby made to visually disappear, and they blend into a seamless common image. This approach means that there need be no intervening componentry between the source of the video image (in this case, the image generator computer) and the projector. The edge blending polygons are themselves part of the visual scene being projected.

The adjustment of the opacity gradients of overlapping polygons is accomplished automatically by using a separate device consisting of a video camera and its own computer, which is connected to each of the image generator computers during the conduct of an adjustment. The camera captures test images projected from each of two adjacent channels; these images consist of only edge blending polygons and alignment markings. The images are digitized by the computer connected to the video camera and operated on by image processing software that analyzes the falloff from opaque to transparent across each of the overlapping polygons and determines the optimum curve for the falloff of each to make the image seamless. Once it has computed the best values, the test computer sends commands to the image generators to adjust their edge blending polygons accordingly. The process is repeated for each pair of overlapping edge blending polygons.

Dynamic Texture Memory Management for 3D PC Graphics Accelerator Cards

The present invention includes software that allows the dynamic reconfiguration of the texture memory provided in low-cost off-the-shelf graphics cards. While dynamic texture management has been implemented in high end graphics workstations using dynamic RAM for texture memory, this is a unique implementation of the technique that optimizes for the static memory used on most low-end graphics boards and can be (executed within the processing power of consumer level PC's. Other software designed to drive such low cost systems can only support loading all textures that for the entire data base to be used into the card's memory at one time. This limits the total texture memory to, typically, 4 to 8 megabytes. This greatly limits the number of textures that can be used, since texture memory is expensive and, thus, the amount available in low cost systems is inadequate to provide the richly textured imagery available from high-end graphics workstations with more of such memory.

Dynamic texture management permits the storage of a large amount of texture data in the graphics computer's main memory and periodically overwriting the graphics board's texture memory with new information. This allows the development of a large number of textures that can be stored in the PC's memory and loaded into the smaller texture memory of the graphics board as they are needed to draw a particular graphics frame, overwriting previously stored textures. This approach increases the performance of low cost graphics cards dramatically. The particular approach includes a first-in-first-out (FIFO) technique that recognizes when the simulated viewpoint is in a particular predefined area in the visual database, determines what should be seen in that area, and loads in the textures required, overwriting those textures that have been in memory for the longest time. The texture memory may be partitioned so that a portion is permanently loaded with the most commonly used textures, while the remainder is available for periodic loading of less commonly used textures.

As noted above, one of the principal advantages of the present invention is the ease with which an entertainment system can be reconfigured to provide a different simulated experience. Naturally, the simulator station itself will need to be replaced if a different type of vehicle is to be simulated. In this regard, the simulator station is preferably constructed to closely resemble the type of vehicle being simulated. In the case of a race car, the simulator station preferably includes a complete and realistic cockpit providing the look and feel of an actual race car. Likewise, in the case of a fighter aircraft simulator, the simulator station would comprise a realistic mock-up of an aircraft cockpit. Regardless of the nature of the simulated experience, the same motion base of the simulator station is used. The host computer 12 must be programmed for the particular simulated experience. However, the clients connected to network 20 may or may not change. In any event, the modular nature of the clients permits any necessary changes to be made with minimal impact on the entertainment facility as a whole.

It will be recognized that the above described invention may be embodied in other specific forms without departing from the spirit or essential characteristics of the disclosure. Thus, it is understood that the invention is not to be limited by the foregoing illustrative details, but rather is to be defined by the appended claims.

What is claimed is:

1. A multi-user simulation system comprising:

a plurality of simulator stations, each simulator station comprising a simulated vehicle accommodating a user and including a user-operable control and a user-viewable display;

a plurality of host computers, each associated with a respective one of the plurality of simulator stations;

a first communications network coupled to each of the plurality of host computers;

wherein each of said plurality of host computers:

maintains a state vector describing a present state of the associated simulated vehicle maintains a dead reckoning model of each of the plurality of simulated vehicles;

maintains a second model of the associated simulated vehicle, said second model having higher resolution than the dead reckoning model;

compares state data calculated by the dead reckoning model with corresponding state data calculated by the second model;

and posts said state vector on the first communication network when the state data calculated by the dead reckoning model differs from the corresponding state data calculated by the second model by more than a predetermined limit.

2. The system of claim 1 further comprising a plurality of second communication networks, each coupled to a respective one of the plurality of host computers.

3. The system of claim 2 further comprising a plurality of image generators, each coupled to a respective one of the plurality of second communication networks.

4. The system of claim 3 wherein a plurality of image generators are coupled to each of the plurality of second communication networks.

5. The system of claim 2 wherein each simulator station is mounted on a motion base.

6. The system of claim 5 further comprising a plurality of motion control computers, each coupled to a respective one of the plurality of second communication networks for controlling motion of an associated motion base.

7. The system of claim 2 further comprising a plurality of sound generators, each coupled to a respective one of the plurality of second communication networks.

8. The system of claim 1 further comprising a central control computer coupled to the first communication network.

9. The system of claim 1 wherein the simulator stations are configured to simulate automobiles.

10. The system of claim 1 wherein the simulator stations are configured to simulate aircraft.

11. The system of claim 1 wherein the simulator stations are configured to simulate spacecraft.

12. The system of claim 1 wherein the simulator stations are configured to simulate water craft.

13. In a multi-player simulation system comprising a plurality of simulated vehicles, a method of controlling operation of the simulated vehicles comprising the steps of:

providing a plurality of host computers, each associated with a respective one of the plurality of simulated vehicles;

providing a first communication network coupled to each of the plurality of host computers;

maintaining a state vector in each of the plurality of host computers describing a present state of the associated simulated vehicle;

each of the plurality of host computers maintaining a dead reckoning model of each of the plurality of simulated vehicles;

each of the plurality of host computers maintaining a second model of the associated simulated vehicle, said second model having higher resolution than the dead reckoning model;

each of the plurality of host computers comparing state data calculated by the dead reckoning model with the corresponding state data calculated by the second model;

each of the plurality of host computers posting its respective state vector on the first communication network when the state data calculated by the dead reckoning model differs from the corresponding state data calculated by the second model by more than a predetermined limit;

each of the plurality of host computers examining the state vectors associated with all other simulated vehicles;

each of the plurality of host computers updating its respective state vector in accordance with the state vectors associated with all the other simulated vehicles.

14. The method of claim 13 further comprising the steps of:

providing a plurality of second communication networks, each coupled to a respective one of the plurality of host computers;

providing a plurality of at least one client resource coupled to respective ones of the plurality of second communication networks.

15. The method of claim 14 wherein the client resource is an image generator.

16. The method of claim 14 wherein the client resource is a sound generator.

17. The method of claim 14 wherein the client resource is a motion generator.

18. The method of claim 14 further comprising the step of each of the plurality of host computers posting its respective state vector on the respective one of the plurality of second communication networks.

19. The method of claim 13 wherein the step of updating the state vector comprises calculating dynamics of a respective simulated vehicle.

* * * * *

UNITED STATES PATENT AND TRADEMARK OFFICE
CERTIFICATE OF CORRECTION

PATENT NO. : 6,126,548
DATED : October 3, 2000
INVENTOR(S) : Jacobs et al.

It is certified that error appears in the above-identified patent and that said Letters Patent is hereby corrected as shown below:

ON THE TITLE PAGE

Item [56], References Cited, please delete the date "4/1994" from patent number 5,299,810, and insert -- 5/1994 --.

Signed and Sealed this

Eighth Day of May, 2001

Attest:

NICHOLAS P. GODICI

Attesting Officer

*Acting Director of the United States Patent and Trademark Office*